United States Patent [19]
Chen

[11] Patent Number: 5,851,689
[45] Date of Patent: Dec. 22, 1998

[54] METHOD FOR OPERATING A FUEL CELL ASSEMBLY

[75] Inventor: Tan-Ping Chen, Walnut Creek, Calif.

[73] Assignee: Bechtel Corporation, San Francisco, Calif.

[21] Appl. No.: 786,954

[22] Filed: Jan. 23, 1997

[51] Int. Cl.$^6$ .................................................. H01M 8/04
[52] U.S. Cl. ........................... 429/13; 429/17; 429/32; 429/34
[58] Field of Search ................... 429/13, 17, 30, 429/32, 34, 38, 39

[56] References Cited

U.S. PATENT DOCUMENTS

| | | |
|---|---|---|
| 3,268,365 | 8/1966 | McQuade et al. . |
| 3,622,394 | 11/1971 | Bawa et al. . |
| 4,160,067 | 7/1979 | Camara et al. . |
| 4,554,225 | 11/1985 | Sounai et al. . |
| 4,591,538 | 5/1986 | Kunz . |
| 4,596,751 | 6/1986 | Kunz et al. . |
| 4,618,543 | 10/1986 | Matsumura et al. . |
| 4,622,275 | 11/1986 | Noguchi et al. . |
| 4,643,954 | 2/1987 | Smith . |
| 4,643,955 | 2/1987 | Smith et al. . |
| 4,659,637 | 4/1987 | Nelson et al. . |
| 4,743,516 | 5/1988 | Noguchi et al. . |
| 4,761,353 | 8/1988 | Knödler et al. . |
| 4,772,634 | 9/1988 | Farooque . |
| 4,818,639 | 4/1989 | Kunz . |
| 4,820,594 | 4/1989 | Sugita et al. . |
| 4,902,586 | 2/1990 | Wertheim . |
| 4,992,342 | 2/1991 | Singh et al. . |
| 5,039,579 | 8/1991 | Kinoshita . |
| 5,068,159 | 11/1991 | Kinoshita . |
| 5,071,717 | 12/1991 | Bushnell .................................. 429/13 |
| 5,071,718 | 12/1991 | Marianowski et al. . |
| 5,082,752 | 1/1992 | Koga et al. . |
| 5,084,363 | 1/1992 | Reiser . |
| 5,094,926 | 3/1992 | Kobayashi et al. . |
| 5,100,743 | 3/1992 | Narita et al. . |
| 5,143,802 | 9/1992 | Wright . |

(List continued on next page.)

FOREIGN PATENT DOCUMENTS

| | | |
|---|---|---|
| 2047457 | 1/1993 | Canada . |
| 0 635896 A1 | 1/1995 | European Pat. Off. . |
| 1 309 517 | 3/1973 | United Kingdom . |

OTHER PUBLICATIONS

Prica Mirjana et al., "Contoured PEN Plates for Improved Thermomechanical Performance in SOFCs," Proceedings of the Second European Fuel Cell Forum, vol. 1, Oslo, Norway, May 6–10, 1996, pp. 393–402.

Petrik M. et al., "Stack Development Status of the Interscience Radial Flow (IRF) SOFC," An EPRI/GRI Fuel Cell Workshop on Fuel Cell Technology Research and Development, Atlanta, Georgia, Mar. 22–23, 1994, 5 pages.

Primary Examiner—Anthony Skapars
Attorney, Agent, or Firm—Townsend and Townsend and Crew LLP

[57] ABSTRACT

A fuel cell assembly (2) includes a vessel (4) containing a gas-permeable, porous housing (16). A fuel cell stack (14), including cells (42) and interconnect plates (44), is contained within the porous housing. Each interconnect plate has oxidant and fuel sides (64, 60) adjacent to the cathode (58) and anode (62) of adjacent cells. Fuel (68) is supplied to the fuel side at positions (78) midway between the center (82) and the periphery (80) of the fuel side. Reaction products (90) are withdrawn from the center of the fuel side. Flue gas (100) is withdrawn from the center (98) of the oxidant side. Air is preheated as it passes through the porous housing to the fuel cell stack. The preheated air combusts residual fuel (110) flowing radially outwardly from the periphery of the stack to further heat the air to the stack operating temperature to eliminate any external preheating of the air. Corrugations (66, 67) on the interconnect plates act as flow deflectors and form the electrical contact surfaces for adjacent cells. The fuel cell stack is preferably oriented horizontally and is allowed to thermally expand and contract in a substantially free manner, to minimize damage to the cells, until the fuel cell stack is close to an operating temperature.

11 Claims, 4 Drawing Sheets

U.S. PATENT DOCUMENTS

| | | |
|---|---|---|
| 5,198,311 | 3/1993 | Nakazawa et al. . |
| 5,208,113 | 5/1993 | Kinoshita . |
| 5,208,114 | 5/1993 | Uematsu et al. . |
| 5,213,912 | 5/1993 | Kunz et al. . |
| 5,232,793 | 8/1993 | Miyauchi et al. . |
| 5,298,340 | 3/1994 | Cocks et al. . |
| 5,308,456 | 5/1994 | Kunz et al. . |
| 5,338,622 | 8/1994 | Hsu et al. . |
| 5,348,812 | 9/1994 | Cocks et al. . |
| 5,348,814 | 9/1994 | Niikura et al. . |
| 5,380,600 | 1/1995 | Hansen et al. . |
| 5,399,442 | 3/1995 | Shunde ............................. 429/32 |
| 5,462,817 | 10/1995 | Hsu . |
| 5,468,573 | 11/1995 | Bregoli et al. . |
| 5,470,670 | 11/1995 | Yasumoto et al. . |
| 5,472,805 | 12/1995 | Briggs et al. . |
| 5,595,834 | 1/1997 | Wilson et al. ..................... 429/30 |

METHOD FOR OPERATING A FUEL CELL ASSEMBLY

BACKGROUND OF THE INVENTION

A fuel cell is an electric cell that converts the chemical energy of a fuel, typically hydrogen, directly into electric energy in a continuous process. Although fuel cells can be used with a variety of fuels and oxidants, they almost exclusively combine hydrogen and oxygen to form water vapor. Fuel cells include an anode in contact with the fuel, a cathode in contact with the oxygen and an electrolyte sandwiched between the anode and cathode. Each cell creates less than one volt so that a series or stack of fuel cells are used to convert fuel into usable energy. Interconnect plates are used between each cell to keep the fuel and oxygen separated and to electrically connect the anode of one cell to the cathode of an adjacent cell.

One source of hydrogen is natural gas. A common way to obtain hydrogen from natural gas is by using a reformer which combines natural gas and steam at a high temperature, such as 760° C., to obtain the hydrogen. Some fuel cells operate using a separate, external reformer to create the hydrogen; other fuel cells combine the function of a reformer into the fuel cell itself by operating the fuel cell at a high enough temperature, as well as other appropriate design considerations.

One type of fuel cell uses radial flow configurations for solid oxide fuel cells. In one design, disclosed in M. Petrik et al., "Stack Development Status of the Interscience Radial Flow (IRF) SOFC", An EPRI GRI Fuel Cell Workshop on Fuel Cell Technology Research and Development, Atlanta, Ga., Mar. 22–23, 1994, the fuel and air are fed to each cell through a pair of holes at the center region of the cell. The fuel and air then flow radially outwardly to the edge of the cell. This flow configuration requires seals to segregate the fuel and air at the feed points and also runs the risk of temperature excursions at the center of the cell where both rich fuel and rich oxygen exist. In another configuration, disclosed in M. Prica et al., "Contoured PEN Plates for Improved Thermomechanical Performance in SOFCs", Proceedings of the Second European Fuel Cell Forum, Vol. 1, pp. 393–402, Oslo, Norway, May 6–10, 1996, the fuel and air are fed to the center of each cell through a pair of needles. These gases then flow radially to the cell edge. This flow configuration eliminates the gas seal requirement but still has problems with regard to temperature excursion. In another configuration, disclosed in European Patent 0,635, 896 $A_1$, the fuel is fed to the center of the cell by a feed needle while air is fed to the entire cathode area by distribution nozzles. The spent fuel and spent air are collected at the cell edge. This configuration eliminates the need for a gas seal and does not have temperature excursion problems. It does, however, require a complex gas nozzle distribution system.

SUMMARY OF THE INVENTION

The present invention is directed to a fuel cell assembly, typically a solid oxide fuel cell assembly, which requires no gas seal, no large axial clamping force, no separate air preheater, no external reformer or pre-reformer and no external steam supply for reforming. The assembly has no gas leakage; cell cracking or other cell damage is minimized and the simplicity of the entire system is greatly enhanced. The present invention provides a relatively low cost and high reliability fuel cell assembly.

The fuel cell assembly includes a vessel defining an inside. A gas-permeable, porous housing is preferably located within the inside of the vessel. A fuel cell stack is housed within the interior of the porous housing. Air, or other oxygen-containing gas, is supplied to the fuel cell stack by delivering air into the region between the vessel and porous housing, the air preferably passing through the wall of the porous housing to reach the fuel cell stack.

The fuel cell stack includes a plurality of alternating cells and interconnect plate assemblies. Each cell has an anode surface and a cathode surface. Each interconnect plate assembly has an oxidant side adjacent to the cathode surface of one cell and a fuel side adjacent to the anode surface of another cell. Fuel is supplied to the fuel side preferably at a plurality of fuel exits positioned midway between a central region of the fuel side and the periphery of the fuel side.

A reaction products collection conduit has a reaction products entrance at the central region of the fuel side for withdrawing reaction products away from the fuel side. A flue gas collection conduit has a flue gas entrance at a central region of the oxidant side for the flow of flue gas away from the oxidant side.

The porous housing is heated by the heat generated by the fuel cell stack. This allows the air passing through the porous housing to be preheated to, for example, 500° C. to 800° C. as the air enters a residual reaction products combustion region defined between the interior of the porous housing and the exterior or periphery of the stack. Residual reaction products which pass radially outwardly from the peripheral edge of the interconnect plate assembly combust with the heated air passing through the porous housing. This acts to heat the air flowing to the oxidant side of the interconnect plate to a desired temperature, typically about 700° C. to 1000° C., so to eliminate any need to preheat the air entering the assembly. The desired temperature will depend upon the desired or required operating temperature for the stack. Also, since the air passes through the porous housing, the porous housing remains relatively cool on the outside surface for both safety and efficiency.

The gas flow along both the fuel side and oxidant side of the interconnect plate is preferably directed by flow deflectors. These flow deflectors are preferably created by corrugating the interconnect plate. The corrugations not only act as flow deflectors but also form the electric contact surfaces with the cathode and anode surfaces of adjacent cells. The oxidant side preferably has radially-oriented flow deflectors while the fuel side preferably has both radially-oriented and rotary-oriented flow deflectors.

The fuel stack is preferably oriented horizontally, that is with the wafer-like interconnect plates and cells oriented vertically. The fuel cell stack is preferably allowed to thermally expand and contract in a substantially free manner until the fuel cell stack is within 50° C., or less, of an operating temperature. This freedom of movement during most of the temperature changes helps to minimize cracking or other damage to the cells and interconnect plates. The outer surface portion of the corrugations are preferably plated with a soft metal, such as silver on the fuel side and gold on the oxidant side, to provide good electrical contact with adjacent cells and to help prevent cracking or other damage to the cells.

The present invention differs from conventional fuel cell systems with regard to fuel and oxygen flow primarily because of the use of split fuel flow on the fuel side of the interconnect plate and the radially inward flow of the oxidant gas (typically air) on the oxidant side of the interconnect plate. Because no rich fuel and rich oxidant coexist at any point, the present invention eliminates the temperature excursion problems associated with conventional fuel cell assemblies without the need for complex gas distribution nozzles. The gas distribution method provides other advantages as well. A portion of the spent fuel (fuel reaction products) can be collected by a collection conduit at the central region of the fuel side; the reaction water product in this spent fuel stream is used as a source of reforming steam so that no external steam generation and boiler feed water treatment are required. The split fuel flow also distributes the fuel quickly to the entire fuel side of the interconnect plate and thus to the anode surface of the cell. This helps prevent the cell from local overcooling by the highly endothermic reforming reaction which occurs. As a result, the stack can readily incorporate the reforming internally without the need for an external reformer.

With the present invention waste heat from the stack can be transferred from the fuel cell stack to the porous housing; this heat in the porous housing is transferred to the air passing in through the porous housing to provide a very effective air preheating. Due to the radial flow of the air through the porous housing, stack cooling along the length of the stack is uniform. Also, the provision of inwardly directed air tends to contain the heat adjacent to the stack so that relatively low temperature vessels or enclosures can be used with essentially no heat losses.

The residual reaction products (spent fuel) of many conventional fuel cell systems are disposed of by burning the spent oxidant at the edge of the cell. With the present invention a portion of the residual reaction products which exits about the periphery of the interconnect plate is burned at the cell edge upon contact with the heated air passing through the porous housing. This provides a final preheating of the air to the cell operating temperature. This direct heating by combustion eliminates the need for an expensive high temperature heat exchanger.

In many fuel cell stack designs the cells need to be clamped together to provide a tight gas seal and to minimize the electrical contact resistance. This clamping inhibits or prevents free expansion and contraction during stack heating and cooling and can result in thermally induced stresses. Therefore, the mechanical force exerted by the clamping device can cause the cells to crack or otherwise fail. The use of a sealless stack design eliminates the need for clamping to provide gas seals. The use of gold and silver provides soft, conforming electric contact surfaces at the operating temperature (typically 700–1000° C.). The use of gold also prevents oxidation at the oxidant side of the interconnect plate. While gold could be used on the fuel side of the interconnect plate, silver is less expensive and the use of gold is not considered necessary because of the lack of oxidation problems at the fuel side.

The present invention reduces some of the expense associated with fuel cell stacks. Conventional fuel cell stacks often use ceramic interconnect plates to match the coefficient of thermal expansion of the ceramic cells. However, to meet mechanical strength requirements, ceramic interconnect plates must be made relatively thick. This thickness requirement, in conjunction with the high material cost for ceramics, can make the cost of the interconnect plates prohibitively high. To eliminate this problem, metal interconnect plates can be used; these interconnect plates need to be doped with special materials, such as yttri or alumina, to adjust the coefficient of thermal expansion. These special alloys are also expensive and tend to be brittle. The free expansion stack aspect of the invention eliminates this problem with conventional fuel cell assemblies by allowing the use of common stainless steel, such as 316, for the interconnect plates.

Other features and advantages of the invention will appear from the following description in which the preferred embodiment has been set forth in detail in conjunction with the accompanying drawings.

DESCRIPTION OF THE PREFERRED EMBODIMENT

Figure 1:
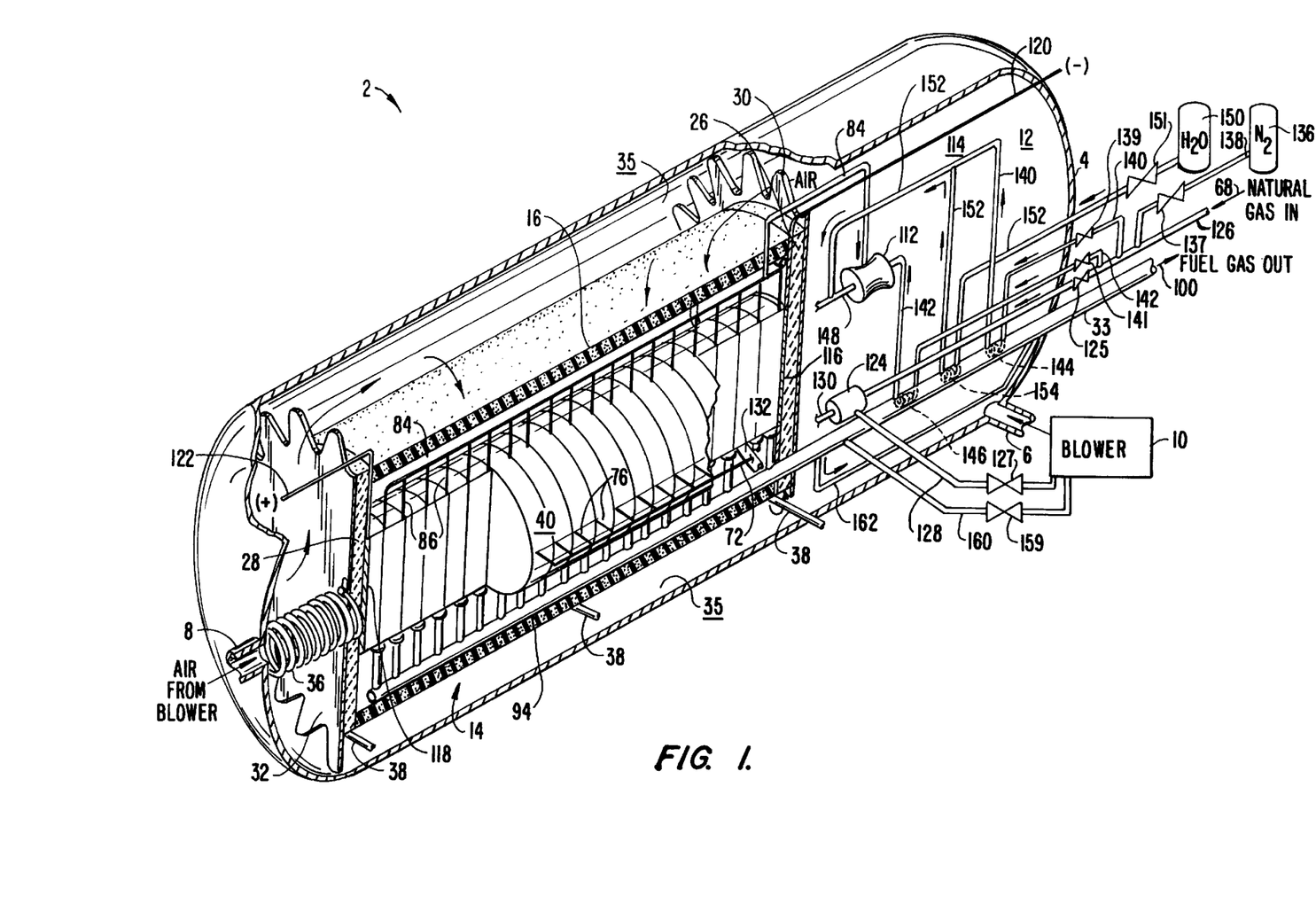
FIG. 1 is a simplified, partially schematic, cross-sectional isometric view of a fuel cell assembly made according to the invention.

Fuel cell assembly 2 is shown in FIG. 1 to include a vessel 4, typically made of carbon steel. Vessel 4 has a pair of air inlets 6, 8 through which air from a blower 10 enters into the inside 12 of vessel 4.

Figures 2, 2A, 2B, 3:
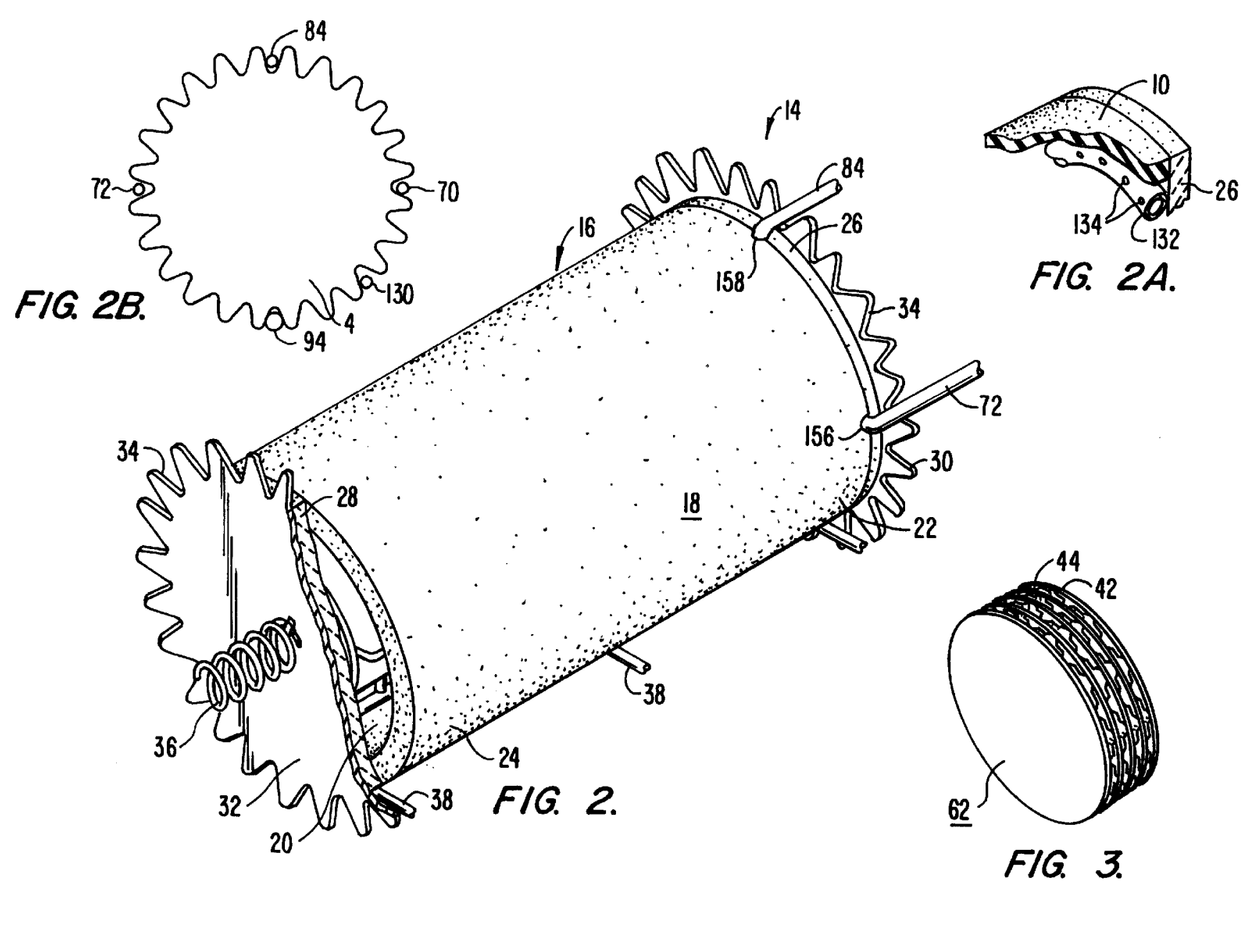
FIG. 2 illustrates the porous housing of FIG. 1 with compartment plates at either end.
FIG. 2A a somewhat enlarged, broken away portion of the corner of the porous housing of FIG. 2 illustrating a perforated feed tube for the initial heat-up of the stack.
FIG. 2B is a simplified end view of the right-hand compartment plate of FIG. 2 showing the positioning of various pipes and tubes between the corrugations at the periphery of the compartment plate.
FIG. 3 is a somewhat simplified view of four interconnect plates and five cells.

Fuel cell assembly 2 includes a fuel cell stack assembly 14, shown best in FIG. 2, comprising a gas-permeable, porous housing 16. Housing 16 is typically made of a metal sponge material, such as stainless steel, which permits air, or other oxidant gas, to pass through its outer peripheral surface 18 and into the interior 20 of housing 16. The ends 22, 24 are sealed by insulating plates 26, 28. Plates 26, 28, typically made of ceramic materials, are both electrical and thermal insulators. Fuel stack assembly 14 also includes compartment plates 30, 32 secured to the outside surfaces of insulating plates 26, 28. Compartment plates 30, 32 have scalloped outer edges 34 which engage the inside surface 35 of vessel 4. Plate 30 is fixed to inside surface 35 while plate 32 slidably engages inside surface. Scalloped edges 34 permit air flow entering inside 12 of vessel 4 from air inlet 6, 8 to flow evenly about outer surface 18 of porous housing 16. This is suggested by the air flow arrows in FIG. 1. Scalloped edges 34 also provide openings for the passage of various tubes and conduits as will be discussed in more detail below. Compartment plate 32 has a compression spring extending axially from the compartment plate and captured between compartment plate 32 and vessel 4 in the region surrounding air inlet 8. The purpose of spring 36 will be discussed below. Assembly 14 is supported within vessel 4 by three horizontal support bars 38, the support bars being secured at either end to inside surface 35 of vessel 4.

Returning now to FIG. 1, fuel cell stack assembly 14 is seen to include a fuel cell stack 40 housed within interior 20 of porous housing 16. Stack 40 is made up of alternating cells 42 and interconnect plates 44. Cells 42 are preferably ceramic cells and interconnect plates 44 are preferably stainless steel. Each cell 42 and interconnect plate 44 has its axial dimension substantially enlarged relative to its diameter for ease of illustration. A typical diameter of cell 42 and interconnect plate 44 would be 2 to 12 inches (5 to 30 cm). The axial dimension 46 of interconnect plate 44, see FIG. 5B, is about 0.25 to 1 inch (0.63 to 2.5 cm) while the axial dimension of cell 42 is about 10 to 1000 microns. Other dimensions can also be used.

Each cell 42 includes an anode layer 48 and a cathode layer 50 between which an electrolyte layer 52 is sandwiched. The outside diameter of anode layer 48 and electrolyte layer 52 are about equal while cathode layer 50 has a smaller outside diameter to leave a peripheral, annular space 54 about cathode layer 50. A metal ring 56, typically made of stainless steel, is sized to fit within annular space 54. Ring 56 is used to help keep fuel from contacting cathode surface 58 of cathode layer 50 as discussed below. Anode layer 48 is typically about 200 microns thick, electrolyte layer 52 is about 20 microns thick and cathode layer 50 is about 5–10 microns thick. Such a thin cell 42 is possible because of the way in which thermal expansion and contraction of stack 40 of cells 42 and interconnect plates 44 are accommodated, as will be discussed below.

Figure 4:
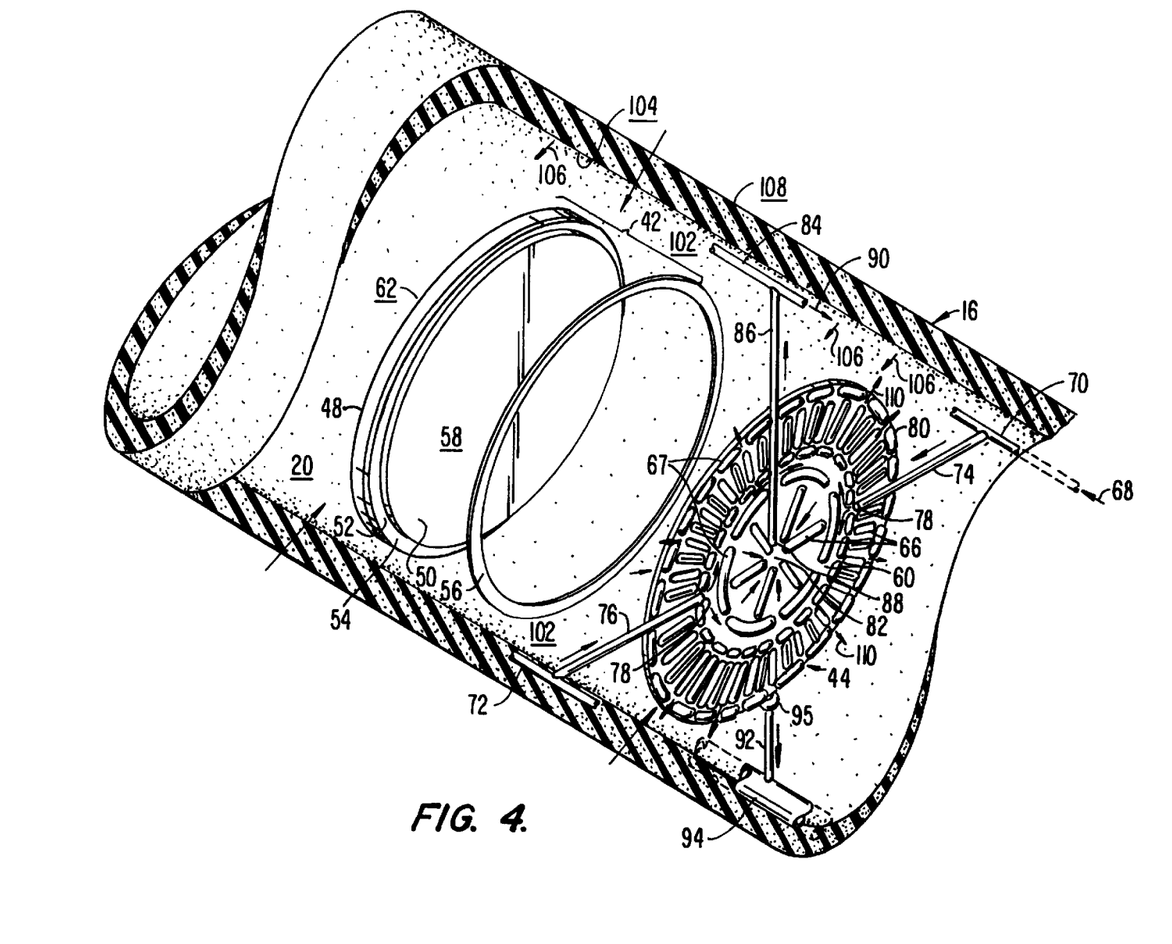
FIG. 4 is an enlarged, exploded isometric view showing the fuel side of an interconnect plate and the cathode surface of a cell within a section of the porous housing.
Figure 5:
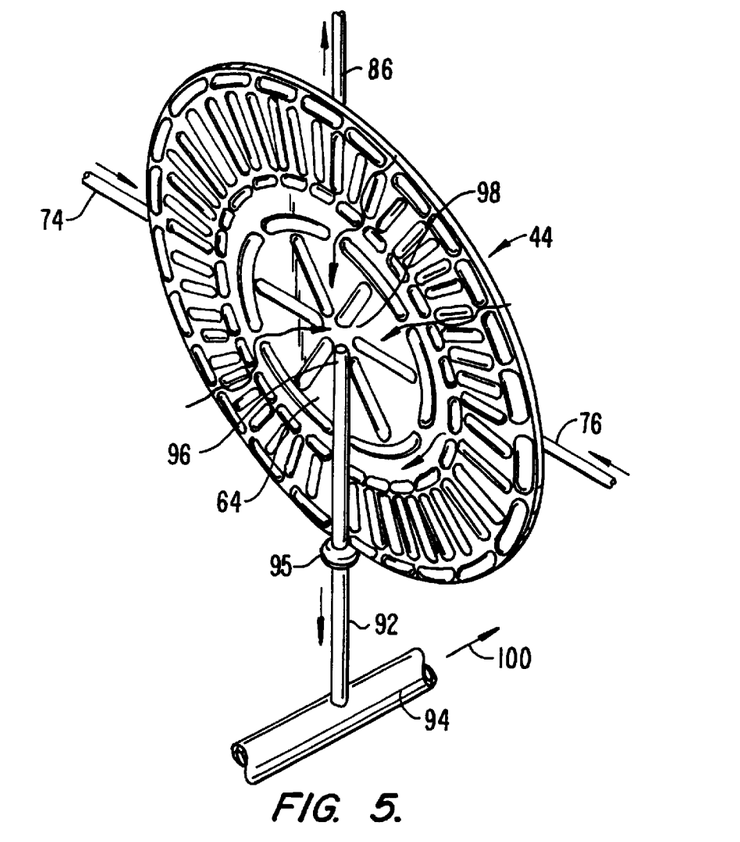
FIG. 5 is a view similar to that of FIG. 4 illustrating the oxidant side of the interconnect plate of FIG. 4.
Figure 5A:
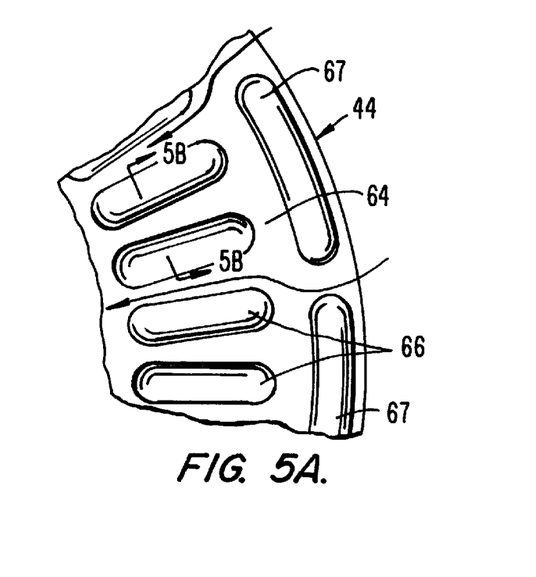
FIG. 5A is an enlarged view of a portion of the peripheral edge of the interconnect plate of FIG. 5.
Figure 5B:
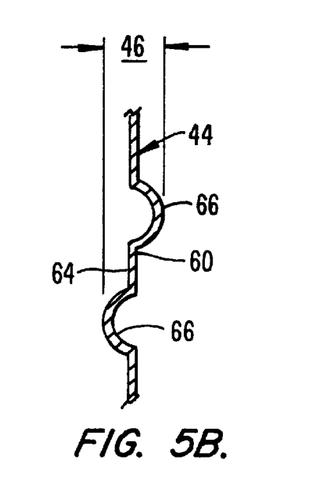
FIG. 5B is a cross-sectional view taken along line 5B—5B of FIG. 5A illustrating the flow deflecting corrugations.

Referring now primarily to FIGS. 4, 5, 5A and 5B, interconnect plate 44 is seen to include a fuel side 60, shown in FIG. 4, facing anode surface 62 of an adjacent cell 42 (not shown in FIG. 4) and oxidant side 64, shown in FIG. 5, facing cathode surface 58 of an adjacent cell 42, shown in FIG. 4. Interconnect plate 44 is preferably about 500–1000 microns thick and has corrugations 66, 67 formed about its entire surface. Radially-oriented corrugations 66, as shown best in FIG. 5B, alternate between convex and concave shapes on each surface 58, 62 to provide radially-oriented flow deflectors 66 for fluid flow along fuel side 60 and along oxidant side 64. However, rotary-oriented flow deflectors 67 are formed only on fuel side 60.

To enhance good electrical contact between interconnect plate 44 and the adjacent cells 42, the outermost portions of corrugations are plated with good electrical conductors such as gold or silver. Gold and silver are also preferred because they both provide relatively soft contact layers for contact with cathode surface 58 and anode surface 62. The corrugations on anode side 62 are preferably plated with silver while the corrugations on oxidant side 64 are preferably plated with gold to keep the contact surfaces from oxidizing on the oxidant side.

Fuel, typically in the form of natural gas 68, flows through a pair of fuel feed tubes 70, 72 which then flows through a pair of gas feed needles 74, 76, one set of needles 74, 76 for each interconnect plate 44. Each gas feed needle 74, 76 has a fuel exit 78 positioned along fuel side 60 midway between an outer periphery 80 of interconnect plate 44 and a central region 82 of fuel side 60. Corrugations 66, 67 cause fuel 68 to flow in both radial and rotary directions as indicated by the various arrows in FIG. 4.

A spent fuel or reaction products collection conduit 84 extends along the length of fuel cell stack 40 overlying the entire fuel cell stack while feed tubes 70, 72 extend along the stack on either side of the stack. A collection needle 86 extends downwardly from collection conduit 84 for each interconnect plate 44. Each collection needle has a reaction products entrance 88 at its distal or lower end positioned at central region 82 of fuel side 60. By the time fuel 68 passes from fuel exit 78 to central region 82 it is mostly spent. The reaction products 90 are drawn away from central region 82 through entrance 88 of collection needle 86. Reaction products 90 contain a mixture of carbon dioxide and water, as well as an amount of unused fuel in the form of carbon monoxide and hydrogen. The use of this will be discussed below.

FIG. 5 illustrates a collection needle 92 extending upwardly from a flue gas collection conduit 94 situated directed below the center of interconnect plate 44. Interconnect plate 44 and adjacent cells 42 are vertically supported by a bulge or enlarged region 95 of collection needle 92. Collection needle 92 has a flue gas entrance 96 adjacent to the central region 98 of oxidant side 64. Flue gas 100 is withdrawn from stack 40 through flue gas collection conduit 94. The flow of the oxidant gas is thus from an annular region 102 defined between the interior wall 104 of porous housing 16 and stack 40. The oxidant gas, typically air, passes through porous housing 16 as indicated by arrows 106. After passing through porous housing 16 this air is heated to, for example, 500° to 800° C. due to the heat generated by fuel cell stack 40 that has been transferred to porous housing 16. The outside surface 108 of porous housing 16 remains relatively cool due to the passage of air through the wall, the air heating up as it passes through. The reaction products 110 flowing radially outwardly from fuel side 60 of interconnect plate 44 contain some combustible gases. Upon entering region 102 these combustible gases react with heated air in region 102 and combust, thus further raising the temperature of the oxidant gas (air) to about 700° C. to 1000° C. The relatively small amount of combustible products within reaction products 110 do not significantly adversely affect the oxygen content of the gas within region 102, which gas is then pulled into the region between cathode surface 58 of cell 42 and oxidant side 64 of interconnect plate 44. The gas flows along oxidant side 64 guided by radially-oriented flow deflectors 67.

Metal ring 56 helps prevent unburned fuel from contacting cathode surface 58, which would cause cathode reduction. Reaction products 90 (spent fuel) are fed to an ejector 112, see FIG. 1, located in the head compartment 114 of the inside 12 of vessel 4. A hydrocarbon fuel feed, typically natural gas 68, is used as the motive gas for ejector 112. The functioning of ejector 112 will be discussed in more detail below. Fuel cell stack 40 includes a pair of end plates 116, 118 which function as the anode and cathode of the fuel cell stack. Lines 120, 122 are connected to end plates 116, 118 for access to the electrical current created by fuel cell stack 40.

Mechanical compression spring 36 is sized so that it exerts a compression force on slidable plate 32 only when stack 40 is within about 50° C. of its operating temperature, that is at or near the end of the preheat cycle. The extreme axial thinness of cells 42 relative to the much greater axial thickness of interconnect plates 44 cause stack 40 to expand and contract axially as if it were made entirely of the interconnect plates. Therefore, applying a compression force on plate 32 applies a compression force on stack 40 because porous housing 16, tubes and conduits 70, 72, 84, 94, and interconnect plate 44 are all made of materials with the same coefficient of thermal expansion, preferably stainless steel. Spring 36 is constantly cooled by air entering inlet 8 to ensure spring 36 retains its elasticity.

During startup, stack 40 is preheated using hot gases generated from burning natural gas 68 with air at startup burner 124. See FIG. 1. Startup burner 124 is supplied with natural gas through a valve 125 along a line 126 and with air from blower 10 through a valve 127, and along a line 128. Hot exhaust gas, used for preheating, passes from burner 124 through a line 130 which connects to a circular feed tube 132 located adjacent to insulation plate 26. See FIGS. 2A and 2B. Circular feed tube 132 has numerous perforations 134 through which the heated gas flows into annular region 102 of interior 20. To keep the hot gases within porous housing 16, blower 10 is operated to direct a sufficient amount of air into inside 12 of vessel 4 so that the air pressure outside of porous housing 16 is slightly greater than the air pressure within the porous housing.

During this preheating it is desired to keep anode surface 62 from oxidizing. To do so, nitrogen from a nitrogen storage bottle 136 is directed through a valve 137 along a line 138, into line 126, out of line 126 and through valves 139, 141 along lines 140, 142. Lines 140, 142 have heat exchange coils 144, 146 formed along their lengths, coils 144, 146 being situated along conduit 94. Thus nitrogen, which is heated within coils 144, 146, passes from ejector 112 through an outlet line 148, outlet line 148 flowing into fuel feed lines 70, 72. The nitrogen then passes through exits 78 of needles 74, 76 situated between fuel side 60 and anode surface 62. This keeps anode surface 62 blanketed with nitrogen to keep the anode surface from oxidizing. Gas (a mixture of nitrogen from bottle 136 and heated exhaust gas from burner 124) is withdrawn from interior 20 of porous housing 16 through flue gas entrance 96 of collection needle 92 and then through collection conduit 94.

When fuel cell stack 40 reaches operating temperature it is ready to accept natural gas 68 or other feed fuel; however, no fuel cell reaction product water is available to recycle through to provide the reforming steam at this time. The required startup reforming steam is generated by a once-through flashing of boiler feed water supplied from a water storage drum 150. Water passes through a valve 151 and along a line 152; line 152 has a heat transfer coil 154 along its length housed within conduit 94. Passing the water through the coil 154 causes the water to be flashed into steam by the passage of the startup flue gas (generated by startup burner 124).

Once the fuel cell stack 40 reaches the operating temperature and sufficient startup reforming steam has been generated, valves 127, 125, 137 and 151 (which are open only during startup operations) are closed and blower 10 blows air into inside 12 of vessel 4 through air inlets 6, 8. Natural gas 68 is pumped through line 126, through line 142 for passage through ejector 112 and through lines 140, 152 to bypass ejector and to flow into outlet line 148. Valves 139, 141 are used to control the proportion of natural gas flowing through ejector 112 along line 142 and bypassing ejector 112 along line 152.

Natural gas 68 passes through line 148 and into lines 70, 72 for delivery to fuel side 60 of each interconnect plate 44. The natural gas then is deflected so to pass in both rotary and radial directions, both radially inwardly and outwardly. Simultaneously, air is being drawn through porous housing 16 and is being created as it is pulled through the porous housing. Final preheating of this air 106 occurs by the combustion of reaction products 110 within annular region 102. The now completely preheated air is drawn into the region between oxidant side 64 and cathode surface 58 of each fuel cell. This radially inward movement is caused by the passage of flue gas 100 from flue gas entrance 96 of collection needle 92 located adjacent the central region 98 of side 64 of each interconnect plate 44. Flue gas 100 is quite hot, typically about 700° C. to 1000° C. and effectively preheats natural gas 68 as the natural gas passes through heat exchanger tubes 144 and 146. To reduce the temperature of the flue gas passing the heat exchangers 144 and 146, a portion of the flue gas can bypass the heat exchangers along line 162; also, blower 10 can introduce ambient air into collection conduit 94 through a valve 159 and along a line 160 during startup operations.

Reaction products from fuel side 60 are collected at central region 82 of the fuel side through entrance 88 of collection needle 86. Collection needle 86 feeds reaction products 90 into reaction products collection conduit 84 which intersects. Reaction products 90 are recycled through ejector 112 with natural gas 68 being used as the motive gas passing through line 142. The discharge through line 148 is a mixture of natural gas 68 and reaction products 90.

Porous housing 16 has openings 156, 158, shown in FIG. 2, formed for the passage of fuel feed tube 72 and reaction products collection conduit 84. Other holes are also formed for fuel feed tube 70, flue gas collection conduit 94 and line 130.

All of the tubes and conduits entering into porous housing 16 are thermally insulated. Similarly, equipment within compartment 114, including ejector 112, startup burner 124 and the various tubes and lines are all thermally insulated. Thermal losses from these components are recovered by the act of preheating the air flowing into head compartment 114 from blower 10.

Modifications and variations can be made to the disclosed embodiment without departing from the subject of the invention as defined in the following claims. For example, stack 40 can be compressed axially by a temperature-actuated biasing element which applies a chosen axial force to the stack only when a predetermined temperature is reached. An axial compression force could also be provided pneumatically instead of mechanically.

What is claimed is:

1. A method for operating a fuel cell assembly comprising the following steps:

providing a fuel cell stack, comprising a plurality of cells alternating with a plurality of interconnect plates within a housing, said interconnect plates comprising fuel and oxidant sides, said fuel cell stack comprising a periphery, said housing comprising a gas-permeable, porous wall surrounding said periphery of said stack to define a region therebetween;

raising the temperature of said stack to a start temperature;

supplying a fuel to the fuel sides of the interconnect plates;

passing an oxygen-containing gas through said gas-permeable, porous wall to said region;

removing reaction products from the fuel side; and removing flue gas from the oxidant side.

2. The method according to claim 1 wherein said fuel supplying step is carried out by introducing the fuel to a position spaced-apart from the periphery and from a central region of the fuel sides of the interconnect plates.

3. The method according to claim 2 wherein the position is chosen to be generally equal distances from the central region and the periphery.

4. The method according to claim 1 wherein the fuel supplying step is carried out by introducing fuel to a plurality of positions adjacent each of the fuel sides, each said position chosen to be generally equal distances from the central region and the periphery.

5. The method according to claim 1 wherein said passing step comprises the step of heating said oxygen-containing gas to a first temperature by the act of passing through said gas-permeable, porous wall.

6. The method according to claim 1 further comprising the step of combusting, within the region, any residual reaction products entering the region from the fuel side.

7. The method according to claim 1 wherein the reaction products removing step is carried out by removing reaction products from central regions of the fuel sides of the interconnect plates.

8. The method according to claim 1 wherein the flue gas removing step is carried out by removing flue gas from central region of the oxidant sides of the interconnect plates.

9. The method according to claim 1 further comprising the step of orienting said stack generally horizontally with said fuel and oxidant sides arranged generally vertically, said stack defining a generally horizontal axis.

10. The method according to claim 9 further comprising the step of permitting the stack to substantially freely expand axially until the stack is within about 50° C., or less, of an operating temperature.

11. The method according to claim 10 further comprising the step of resiliently axially compressing the stack when the stack is within about 50° C., or less, of the operating temperature.

* * * * *